United States Patent
Zeppenfeld et al.

(10) Patent No.: US 9,172,808 B2
(45) Date of Patent: Oct. 27, 2015

(54) SYSTEMS AND METHODS FOR IDENTIFYING A CALLER

(71) Applicant: Victrio, Inc., Menlo Park, CA (US)

(72) Inventors: Torsten Zeppenfeld, Emerald Hills, CA (US); Joseph James Schmid, Silver Springs, MD (US); Manish Brijkishor Sharma, Coppell, TX (US); Lisa Marie Guerra, Los Altos, CA (US); Richard Gutierrez, San Jose, CA (US); Mark Andrew Lazar, Los Altos Hills, CA (US); Vipul Niranjan Vyas, Palo Alto, CA (US)

(73) Assignee: Verint Americas Inc., Alpharetta, GA (US)

( * ) Notice: Subject to any disclaimer, the term of this patent is extended or adjusted under 35 U.S.C. 154(b) by 0 days.

(21) Appl. No.: 14/188,009

(22) Filed: Feb. 24, 2014

(65) Prior Publication Data
US 2014/0254778 A1 Sep. 11, 2014

Related U.S. Application Data

(60) Provisional application No. 61/768,382, filed on Feb. 22, 2013.

(51) Int. Cl.
*H04M 1/64* (2006.01)
*H04M 3/523* (2006.01)
*H04M 3/51* (2006.01)
*G10L 17/12* (2013.01)

(52) U.S. Cl.
CPC ............ *H04M 3/523* (2013.01); *H04M 3/5183* (2013.01); *G10L 17/12* (2013.01); *H04M 2203/6045* (2013.01); *H04M 2203/6054* (2013.01)

(58) Field of Classification Search
CPC ............ H04M 2203/6009; H04M 2203/6027; H04M 2203/6045; H04M 2203/6054; H04M 2203/6072; H04M 2203/6081; H04M 2203/609
USPC ............... 379/88.01–88.04, 265.01; 713/166; 704/260, 246; 705/39
See application file for complete search history.

(56) References Cited

U.S. PATENT DOCUMENTS

| | | | | |
|---|---|---|---|---|
| 7,043,432 | B2 * | 5/2006 | Bakis et al. | 704/260 |
| 8,014,496 | B2 * | 9/2011 | Schultz | 379/88.02 |
| 8,249,225 | B2 * | 8/2012 | Jaiswal et al. | 379/88.02 |
| 8,346,659 | B1 * | 1/2013 | Mohsenzadeh | 705/39 |
| 8,621,209 | B1 * | 12/2013 | Johansson et al. | 713/166 |
| 2006/0245576 | A1 * | 11/2006 | Henry | 379/265.01 |
| 2010/0278317 | A1 * | 11/2010 | Broman et al. | 379/88.02 |
| 2012/0284026 | A1 * | 11/2012 | Cardillo et al. | 704/246 |

* cited by examiner

*Primary Examiner* — Md S Elahee
(74) *Attorney, Agent, or Firm* — Meunier Carlin & Curfman

(57) ABSTRACT

Systems and methods for authenticating callers are disclosed that may obtain identifying data and a voice print, and compare the voice print to one or more stored voice prints. Further, one or more initial scores may be calculated based on the data and the comparison, and a confidence interval score may also be calculated. The systems and methods may determine whether to authenticate based on the one or more initial scores and the confidence interval score.

18 Claims, 9 Drawing Sheets

SYSTEMS AND METHODS FOR IDENTIFYING A CALLER

This applications claims priority to provisional U.S. Application No. 61/768,382, filed Feb. 22, 2013.

BACKGROUND

Accurately identifying callers is an important part of any secure system. When a customer calls their bank, the bank will need to take steps to ensure that the caller is an authenticated user. Some callers may pretend to be a banking customer, but they are really seeking to defraud the bank by transferring money to another account or gaining access to a customer's banking information. A fraudulent caller may also contact a cable company or cell phone company to gain access to a customer's credit card information or other personal information. This leads to significant costs to banks, credit cards, financial institutions, and any other entity that needs to authenticate users, not to mention the loss and hassle to actual customers.

As a result, financial institutions take a number of steps to accurately identify a caller. A financial institution typically will ask a caller their name, date of birth, address, and other identifying information such as their mother's maiden name. This information, however, is readily available through internet sources, making it fairly easy for a fraudulent caller to imitate an actual customer. Financial institutions may therefore ask even more information of a caller, such as their last four digits of their social security number, their account numbers, and other identifying information. This additional information provides some enhanced level of security, but can still fall into the wrong hands, resulting in unauthorized access to private accounts. Asking numerous identifying questions also consumes the time of call center operators. Many financial institutions receive tens of thousands of calls per day, or more, so adding even thirty seconds to each call results in significant costs to operate a call center. Customers also become frustrated with having to repeatedly answer identifying questions.

Accordingly, systems and methods for identifying a customer are needed that can accurately identify customers without relying solely on information that can easily fall into the hands of unauthorized users.

SUMMARY

Systems and methods for authenticating callers are disclosed that may obtain identifying data and a voice print, and compare the voice print to one or more stored voice prints. Further, one or more initial scores may be calculated based on the data and the comparison, and a confidence interval score may also be calculated. The systems and methods may determine whether to authenticate based on the one or more initial scores and the confidence interval score.

DESCRIPTION

The disclosed systems and methods provide for secure authentication of users using a combination of data and voice recognition.

Figure 1:
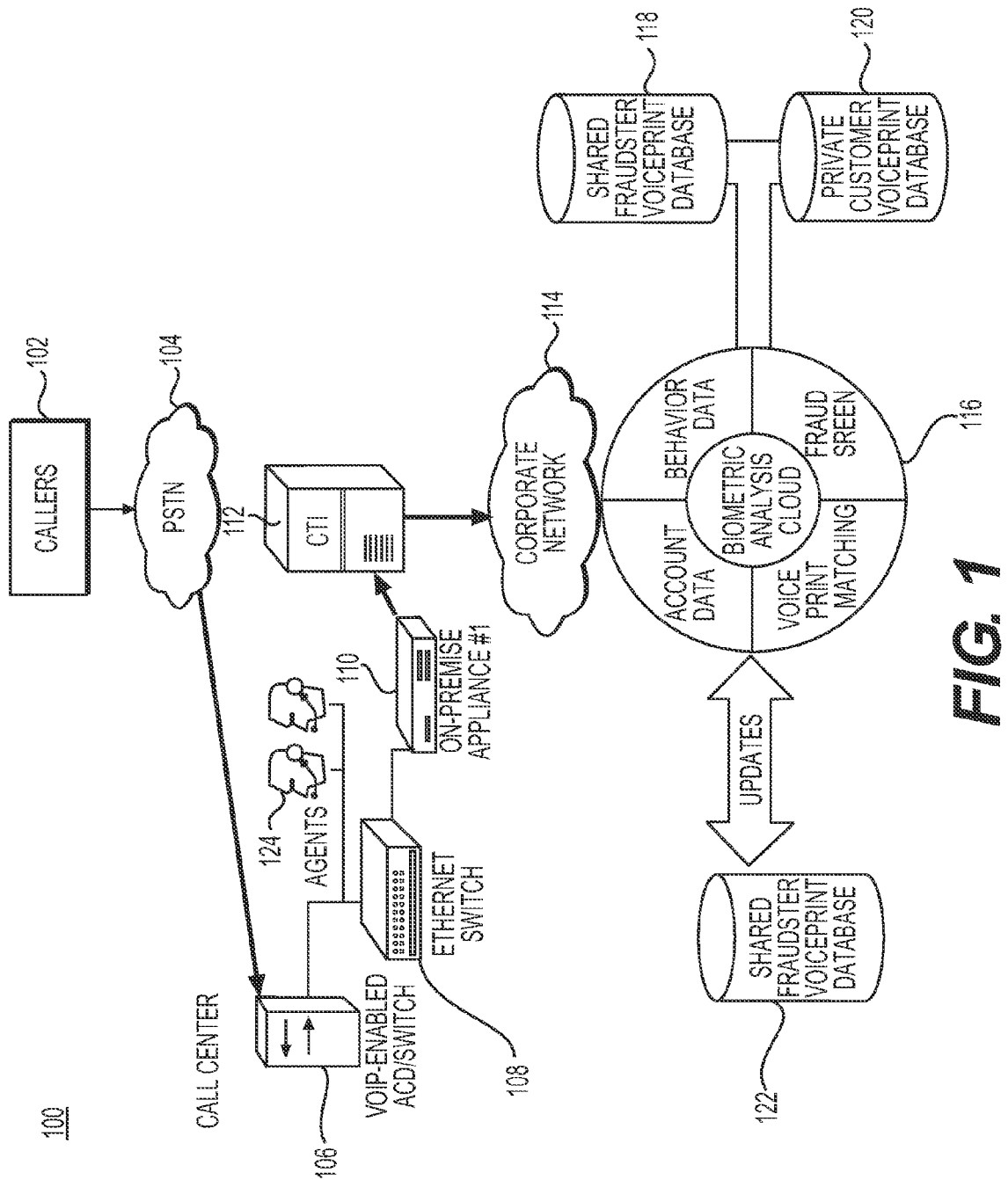
FIG. 1 illustrates an exemplary system for authenticating a user.

FIG. 1 illustrates an exemplary system 100 for authenticating a user. Callers 102 may call a variety of businesses to perform various transactions using a traditional public-switched telephone network 104. For example, callers 102 may call their bank to obtain their account balance, perform a balance transfer, obtain a new debit or credit card, update their address, pay bills, and perform any number of other banking tasks. Callers 102 may also dial any other type of service provider, such as a cell-phone company, cable television company, or internet provider, to update account information and change account features. The system 100 may be used for any type of call where the called party would want to authenticate a user when performing requested transactions.

Call centers may use a voice over IP switch 106 to receive calls from the public-switched telephone network 104 and provide digital signals to Ethernet switch 108. Ethernet switch 108 may be connected to on-premise appliance 110, which can serve as an interface between incoming calls and the computer telephone integration (CTI) unit 112. CTI 112 may merge incoming data and telephone calls for agents 124. When a caller contacts a service center, they may be initially greeted with an automated prompting system that asks basic information such as their account number or other identifying information, and the type of information the user requests. For example, a caller may be prompted to enter their date of birth and a portion of their account information, either using the numeric keypad or using voice, and then select from a menu indicating that they would like to obtain their account balance. This information can be stored by CTI 112 so that if the caller later needs to transfer to an agent 124 for further information, the caller does not have to re-enter it. Instead, the information will be stored and associated with this particular caller's connection and automatically displayed for an agent 124 using CTI 112.

While voice-over IP switch 106, Ethernet switch 108, on-premise appliance 110, and CTI 112 have been described as separate components, these components may be combined into one or more computing units. Further, the telephonic connection coming from PSTN 104 is just one example, and it will be appreciated that other voice connections may be used that may use different connecting components and still be consistent with the disclosed embodiments, such as internet audio communications or audio input at a point-of-sale device or ATM. Moreover, the voice-over IP switch 106, Ethernet switch 108, on-premise appliance 110, and CTI 112 need not be stored in the same geographic location within a call center, but can be dispersed over one or more networks.

CTI 112 connects to a corporate network 114 (although any other type of network may be used) to interface with a biometric analysis cloud 116. The biometric analysis cloud 116 may store account data, such as account numbers, account balances, current addresses on file, authorized users, and other information. Biometric analysis cloud 116 may also store behavioral data, such as transactional data for a particular user, including when a user typically calls in, whether the user transfers money on a regular basis and in what amounts, what types of information the user typically requests (e.g., an account balance), whether the user travels internationally, and any other type of behavioral information that would identify the patterns for a particular user. As described in more detail below, these patterns can help identify fraudulent callers when an unusual transaction is requested. For example, one user may transfer several thousand dollars to another account on a monthly basis. A subsequent call requesting this transfer therefore may not raise any indications of fraud, whereas a call requesting a transfer of several thousand dollars from a user who never transfers money may require additional scrutiny.

Biometric analysis cloud 116 may also perform voice print matching to determine whether a caller is authorized or unauthorized. Biometric analysis cloud 116 also may assist with fraud screening, which will be described in more detail below, along with additional examples information stored by biometric analysis cloud 116. It will be appreciated that any type of information that can help authenticate a caller may also be used in the analysis. Further, while described as a cloud 116, biometrics may be stored locally, remotely on a dedicated server, or in a hybrid solution using a combination of customer-based equipment and data center equipment.

Biometric analysis cloud 116 may interface with a fraudster voiceprint database 118 and a private customer database 120. Databases 118 and 120 may store voiceprints or voice prints of callers that are both authorized and unauthorized. A voice print may be used with reference to a speaker model representing the unique characteristics of an individual's voice, and/or a language model representing linguistic characteristics of the speaker. The voice print may include a collection of features that are extracted from an audio signal, of the individual's voice, and encoded within a specific statistical framework. In various embodiments, these features include cadence, tone, rate of speech, spectral characteristics, and/or other descriptive information about the voice and vocal track of the speaker that describes the speaker (separately from the words spoken). Other synonyms for a voice print may include, but are not limited to, a voice signature, a voice model, speaker model, a voice portion of a speaker model, and also in some instances, simply a speaker voice. Additionally, audio information or data may be extracted from call audio data including both speaker models that represent the voice of a speaker and channel models that represent a communication profile of an audio path for a channel used by the speaker. The communications profile may include noise models, background noise, transfer path functions, as well as other representative characteristics that may be determined for a communications channel that would be known to one of ordinary skill in the art.

Biometric analysis cloud 116 may also interface with a shared fraudster database 122, which may aggregate voice prints from multiple institutions to identify fraudsters from multiple call centers. A company may store their own identified and known fraudsters within database 120, but this list will be limited to only those fraudsters identified by that company. The same unauthorized callers, however, typically attempt to gain access to multiple accounts across multiple institutions. By sharing fraudulent voice prints, each institution gains the benefit of a larger database of unauthorized callers. A company may store fraudulent voice prints in database 120. The fraud may be handled once the fraudulent nature of a voice has been confirmed, such as after identifying an unauthorized transaction. For example, an account may be closed and the fraudulent voice print may be transferred from private customer voiceprint database 120 to either or both of fraudulent database 118 or shared fraudulent database 122. In this way, shared fraudulent database 122 contains voice prints of unauthorized callers who have attempted to or have successfully gained unauthorized access to an account.

Figure 2:
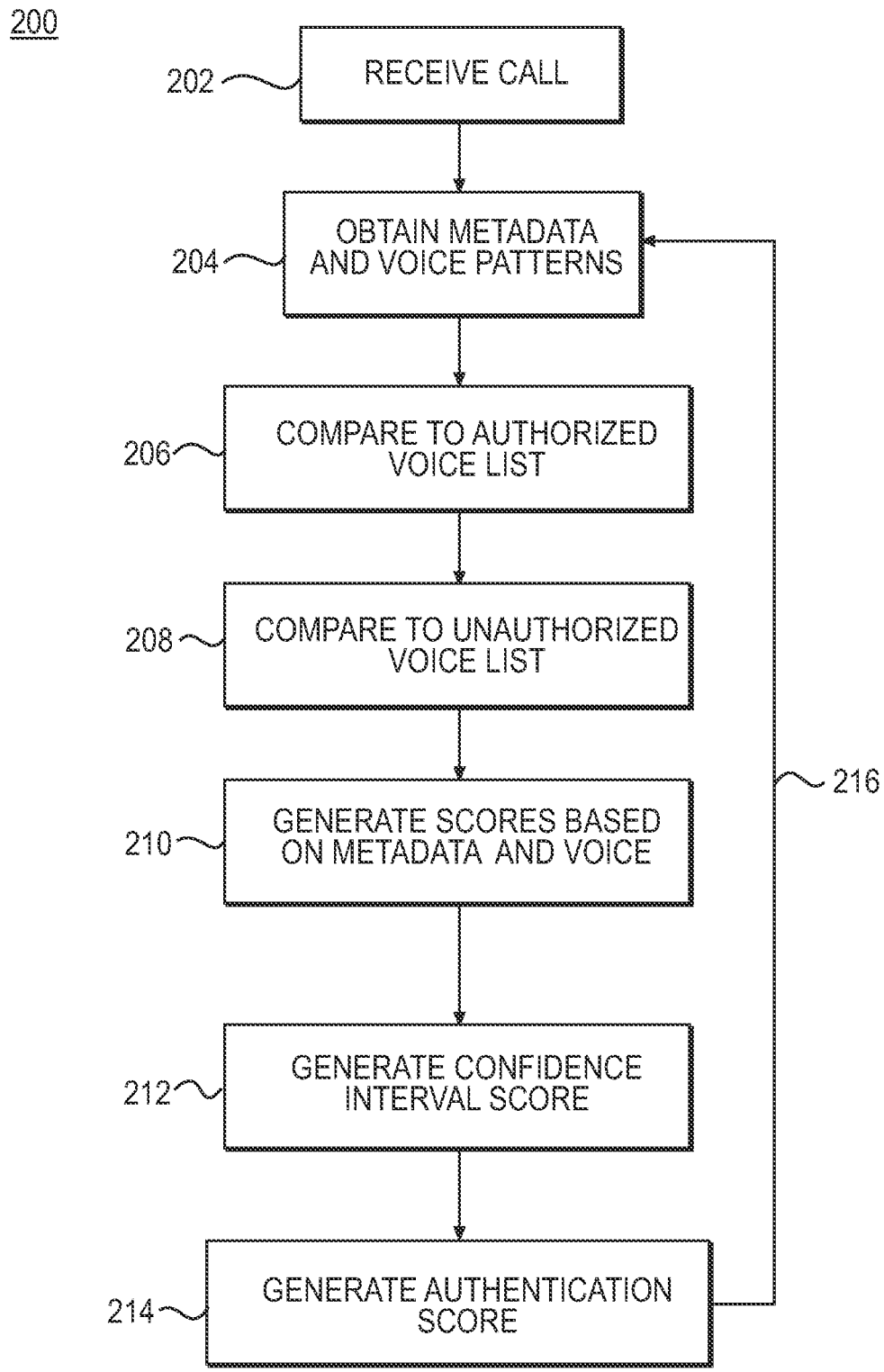
FIG. 2 illustrates an exemplary method for authenticating a user.

Turning now to FIG. 2, an exemplary method 200 for authenticating a caller will be described. At step 202, system 100 may receive a call. Next, method 200 may obtain metadata and voice prints from a caller at step 204. For example, the caller may be asked to enter data about themselves or their account, which will also be referred to as metadata. The metadata may include non-biometric information relating to a caller. The metadata that a caller provides may escalate throughout the call depending on the nature of transaction. Examples of metadata include a user's address, how many authorized users exist on the account, the account number, a transaction number that specifies a transaction that the call was in reference to, whether a block has been placed on the account, when an account was opened, a user's personal identifying information such as date of birth, social security number or other government issued identification number, e-mail address, account type (e.g., business, consumer, reseller, etc.), account opening date, credit limit, list of transactions associated with the account, place of employment, and mother's maiden name. Examples of transaction metadata include a transaction identifier that uniquely identifies the transaction, a timestamp specifying a date and time for the transaction, a transaction disposition (e.g., change of address, account balance check, account payment details, account plan change, and so forth), a shipping address, and combinations thereof.

Metadata may also be automatically collected, such as the phone number associated with an incoming call and the type of connection used. For example, an incoming call from a cell phone associated with the user's cell phone number stored for the account indicates a low risk. However, if the call were received from a different number or over a voice-over IP connection, it may indicate an unauthorized caller is attempting to impersonate the user. A channel model may also be used and may include information regarding the path that was traversed by an audio sample (e.g., the path between the caller and the caller agent or enterprise system). The present technology may evaluate and model the delay present in the audio signal to characterize the path taken by the audio signal. In addition to modeling delay, jitter, echo, artifacts (such as artifacts introduced by audio compression/encoding techniques), error recovery, packet loss, changes to the signal bandwidth, spectral characteristics, and/or other audio artifacts that occur at switching boundaries may also be used to evaluation the signal. With particular regard to VoIP paths, discrete devices (e.g., routers, gateways, servers, computing devices, etc.) involved in the transmission of VoIP data may also imprint artifacts in an audio sample. The channel model also can model handset characteristics such as microphone type. It will be understood that the channel characteristics for a segment of call audio data may be sufficiently unique to determine that separate segments of call audio data belong to two separate speakers. For example, a customer calling into an enterprise may have channel characteristics that are inherently distinctive relative to the channel characteristics associated with call agents of the enterprise. Therefore, differences in channel characteristics may alone suffice as a basis for diarizing and separating segments of call audio data.

The metadata may be collected automatically, through automated prompts, or by an agent. For example, a caller may initially be prompted to enter their date of birth and a portion of their account information using an automated prompt. A caller may enter this information using a keypad or by voice. In the example where a caller enters the information using their voice, their voice prints may also be monitored. Alternatively, voice prints may be monitored once a caller connects to an agent 124. The incoming call may also be assigned a queue identifier that identifies the telephony queue into which a call event has been directed by the call center (e.g., sales, technical support, fraud review, etc.), a timestamp that indicates a date and time when the call event was initiated, a call center identifier that indicates the call center which initially received the call event, and/or the like.

Next, method 200 may compare a caller's voice prints to a list of authorized voices at step 206. Voice prints may be stored for all calls, or on some predefined intervals, as described in more detail below. Each account may have multiple authorized voice prints associated with the account, such as where multiple users have a joint checking account. The voice prints may also be compared to unauthorized voice prints at step 208. The voices of known fraudsters may be stored in a database and used to compare with the voice of an incoming caller. It will be appreciated that an authorized voice print for one account may be unauthorized for another account. Accordingly, authorized voices may be stored globally or for each account.

At step 210, method 200 may generate one or more initial scores based on the metadata and voice prints. For example, if a caller is asked three pieces of personal identifying information such as their name, date of birth, and account number, and correctly answers all three pieces of information, the initial metadata score may be one hundred percent. If a caller does not know the answer to one of the questions, or gets the answer wrong, the initial metadata score may be reduced appropriately, such as to sixty-six percent in the example of three questions. Not answering a question correctly may indicate fraud.

Account pattern information may also be used to generate the initial metadata score or a separate account pattern score, which can be used for subsequent calculations described below. For example, an incoming call late at night or in the middle of the night may receive a high fraud weighting where transactional history data indicates the user typically calls during the morning. Further, a recent online password change or other high risk activity such as ordering replacement cards to an alternate address may cause the initial scores to be adjusted to suggest the possibility of fraudulent activity.

Device authentication may also be used to create an initial device score. For example, the incoming caller identification information may be used to check that the call originates from a known source. The type of connection may also be considered, so that a voice-over IP connection may indicate a fraudulent caller trying to pretend to be calling over a landline or cell phone associated with the account. Device fingerprinting and monitoring signal variances can likewise be used to distinguish the type of device and connection being used for an incoming call. Any deviation from what would be expected based on a user's account information may suggest an attempt at unauthorized access.

The type of metadata may also be weighted to correlate with the likelihood that a piece of metadata authenticates a caller. Names and addresses are publically available and therefore provide low security and would receive a low weighting. Full social security numbers, on the other hand, provide a higher degree of confidence that the caller is an authenticated user, and therefore may receive higher weighting.

Additionally, scores may be calculated based on comparing a caller's voice to authorized voice prints for that account. A perfect match may indicate a high initial authorized voice score. However, the quality of voice recognition will vary as is known in the art based on the number of prior samples and other variables such as the clarity of telephone connection, and whether a caller may be tired, excited, or in another mood that alter their voice inflections. Similarly, an initial fraudulent voice score for an unauthorized voice may be calculated by comparing the caller's voice to known fraudulent voice prints. While several initial scores have been described, it will be appreciated that these factors may be combined into a single initial score that indicates the likelihood that a caller is either authorized or unauthorized.

Next, method 200 may generate a confidence interval score at step 212. The confidence interval score accounts for the fact that the system's confidence that a caller is authorized may change throughout a call. Asking a caller to provide exhaustive identifying information at the beginning of a call can frustrate users and waste time. For example, performing a basic transaction such as requesting an account balance may not require the heightened security associated with performing other transactions such as large account balance transfers or changing the mailing address associated with an account. As the call progresses, callers may provide additional information or metadata that makes the system more confident the caller is authorized. Voice recognition also improves greatly with time, providing a higher confidence in the accuracy of an initial authorized voice score relating to whether a voice print is authorized.

The confidence interval score therefore accounts for the changing confidence that the initial scores are correct. In one exemplary embodiment, system 100 may initially believe a caller's voice is not recognized, but that low initial authorized voice score may be associated with an equally low confidence interval. As the call continues, additional voice samples will be obtained, and the confidence interval may increase to indicate a strong likelihood that a caller is not authorized. Alternatively, system 200 may initially believe that a user is authorized, but as the call progresses system 200 may determine that a voice changer has been used, indicating a high likelihood of fraud. Either way, the likelihood of accurately determining whether a caller is authorized increases with time throughout the call. As one example, the first fifteen seconds of a call may be associated with a low confidence interval because voice recognition will likely be incomplete, which may increase at a range of fifteen to thirty seconds, again at thirty to sixty seconds, again at sixty to ninety seconds, and peaking after ninety seconds. These confidence intervals may be adjusted based on the complexity of received metadata, as already described. While exemplary ranges have been provided, other durations may be used.

In another exemplary embodiment, the confidence interval score may be a used in association with the previously calculated individual scores. For example, a n authorized voice score may have a confidence interval associated with it. Assume the initial authorized voice score is 500, plus or minus 100 to indicate that the initial authorized voice score is a best estimate based on the current information. The confidence interval in this example would be 400 to 600, indicating a range of confidence in the accuracy of the initial authorized voice score of 500. With a small amount of caller speech data, the confidence interval in this exemplary embodiment will be large (e.g., 400 to 600), and it will shrink as more voice is acquired. For example, after thirty seconds of monitoring voice during a call and matching the voice with stored voice patterns, the confidence interval may shrink to a range of 450 to 550, indicating a greater confidence that the initial authorized voice score for voice pattern matching is a more reliable estimate.

Finally, an identification confidence score may be generated at step 214. The identification confidence score may be any combination of the initial score(s) and the confidence interval score. In one exemplary embodiment, the initial score indicating likelihood of an unauthorized voice may be subtracted from the initial score indicating a likelihood of an authorized voice. This combined score may be averaged with the initial score relating to metadata, and then weighted based on the confidence interval score. For example, assume the initial voice recognition score indicates 90% confidence of an authorized user, and 2% indication of a possible unauthorized user. The overall voice recognition component therefore may be 88%, which can be combined with an exemplary 100% metadata recognition where the user correctly entered all identifying information, and the call originates from a known phone number using a known connection. Combining 100% and 88% yields a 96% indication that the user is authorized. If the call has been ongoing for more than a defined amount of time that allows for full, accurate voice recognition, such as sixty seconds, the confidence interval score may be 100%. Combining the 96% indication of an authorized user based on the initial scores, and the confidence score of 100% yields a 98% identification confidence score. The resulting identification confidence score may be graded and presented to a call agent 124 in numerical form, using color coding (e.g., red, yellow, or green), or any other way, as described below with reference to FIGS. 5 and 6A-C. While one example of calculating an identification confidence score has been provided, other calculation methods, such as a nonlinear calculation, weighted calculation, or machine learning with neural networks, may also be used.

In another exemplary embodiment, the lower end of a confidence interval range, such as 400 in the preceding example, may be used to indicate whether a caller is authorized. The upper end of the confidence interval (e.g., 600) may be used to indicate whether the caller is unauthorized. Assume now that a user may be authorized for a transaction such as paying a bill with a score of 450. Simply taking the exemplary initial authorized voice score of 500 and comparing it to the required threshold of 450 would indicate the caller is authorized for this transaction. The exemplary confidence interval, however, has a range of plus or minus 100, so the initial score of 500 minus a range of 100 yields a score of only 400, below the threshold. The initial authorized voice score of 500 may, in one embodiment, remain unchanged during the call, but the confidence interval may shrink as more data is acquired. For example, after thirty seconds of the call, the confidence interval may shrink to a range of plus or minus twenty-five, indicating a greater likelihood that the initial score is correct. Now, the initial score of 500 minus twenty-five yields an identification confidence score of 475, making the user authorized to perform the exemplary transaction of paying a bill.

Method 200 may repeat and loop throughout a call, as shown at step 216. This allows the method to continuously update initial scores, such as metadata scores, authorized voice score, and possibly fraudulent voice score, and also update the confidence interval score as a call progresses. The identification confidence score may therefore be generated in real-time throughout a call. As a result, a caller does not need to provide all of their information at the beginning of a call, and an agent 124 can answer basic questions at the beginning of a call while waiting for additional time to pass that may result in higher initial scores, confidence interval scores, and resulting identification confidence scores. While shown as providing real-time feedback to step 204, method 200 may also repeat by only updating the confidence interval score 212 throughout a call. Agents 124 therefore receive a constant, up-to-date notification of the current authentication level for a caller.

Figure 3:
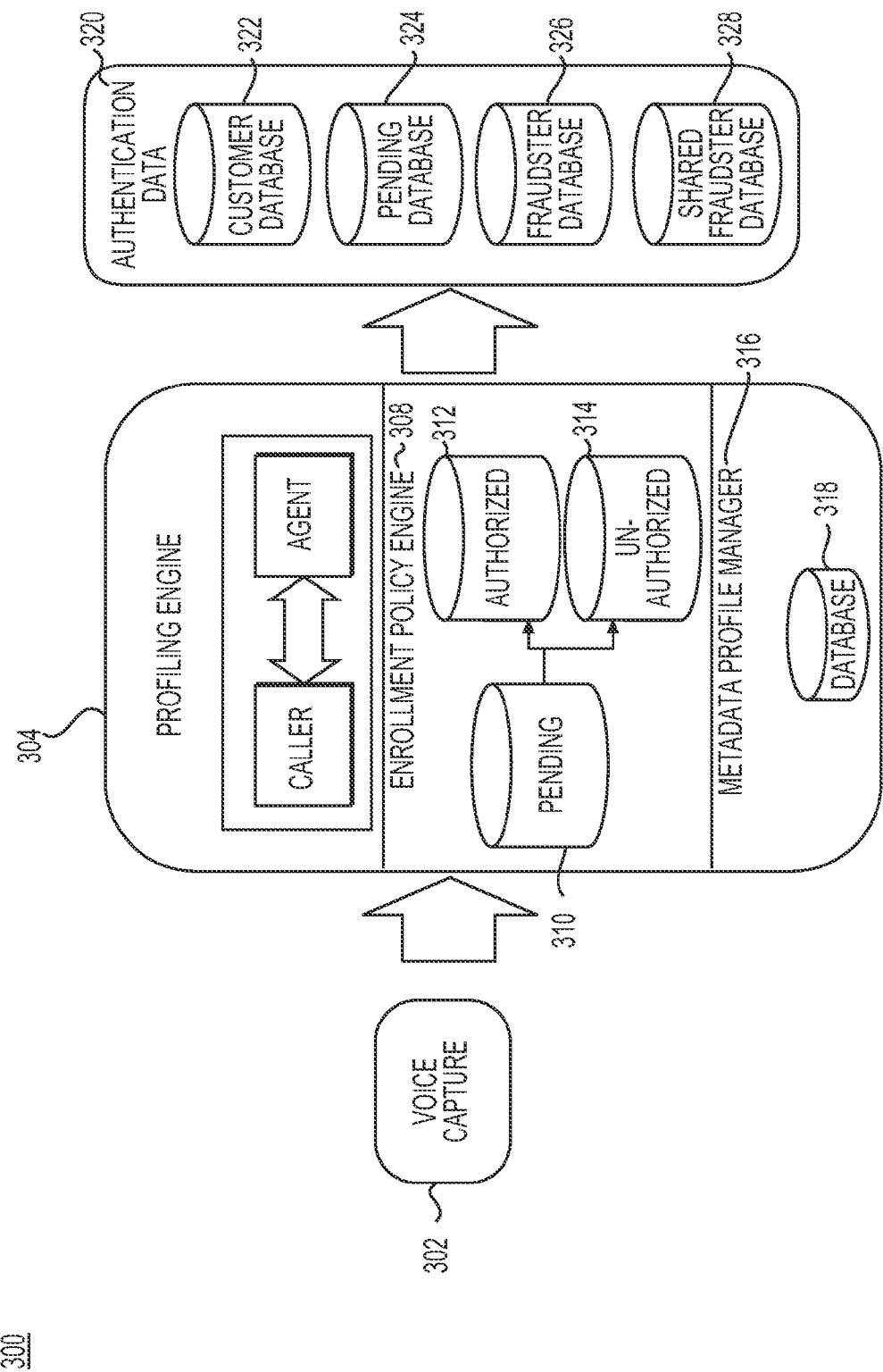
FIG. 3 illustrates an exemplary system for evaluating and storing voice prints.

FIG. 3 illustrates an exemplary system 300 for evaluating and storing voice prints. System 300 may be part of, or separate from, system 200. As illustrated, incoming calls may be received at a voice capture module 302. Calls may come from, for example, a cell phone, voice-over IP connection, traditional landline telephone, or a voice recording. Profiling engine 304 may receive voice from incoming calls and monitor the voices between a caller and an agent to identify the caller.

Enrollment policy engine 308 may categorize voice and store it in several databases, or different portions of a database. Pending voice database 310 may include voice that has been recorded but has not aged to maturity for inclusion in an authorized database 312 or unauthorized database 314. The process of deciding when to store voice as authorized voice will be described in more detail with reference to FIG. 4. Unauthorized database 314 may store voice that has been determined to be fraudulent, whether for a particular account or for all accounts. Finally, profiling engine 304 may also include a metadata profile manager 316 that uses database 318 to store the described metadata.

Enrollment policy engine 308 may store authentication data 320. Authenticated voice may be stored in customer database 322, pending voice that has not yet been classified may be stored in pending database 324, and unauthorized voice may be stored in fraudster database 326. Finally, a shared fraudster database 328 may store fraudulent voice recordings from other companies, as previously described.

Figure 4:
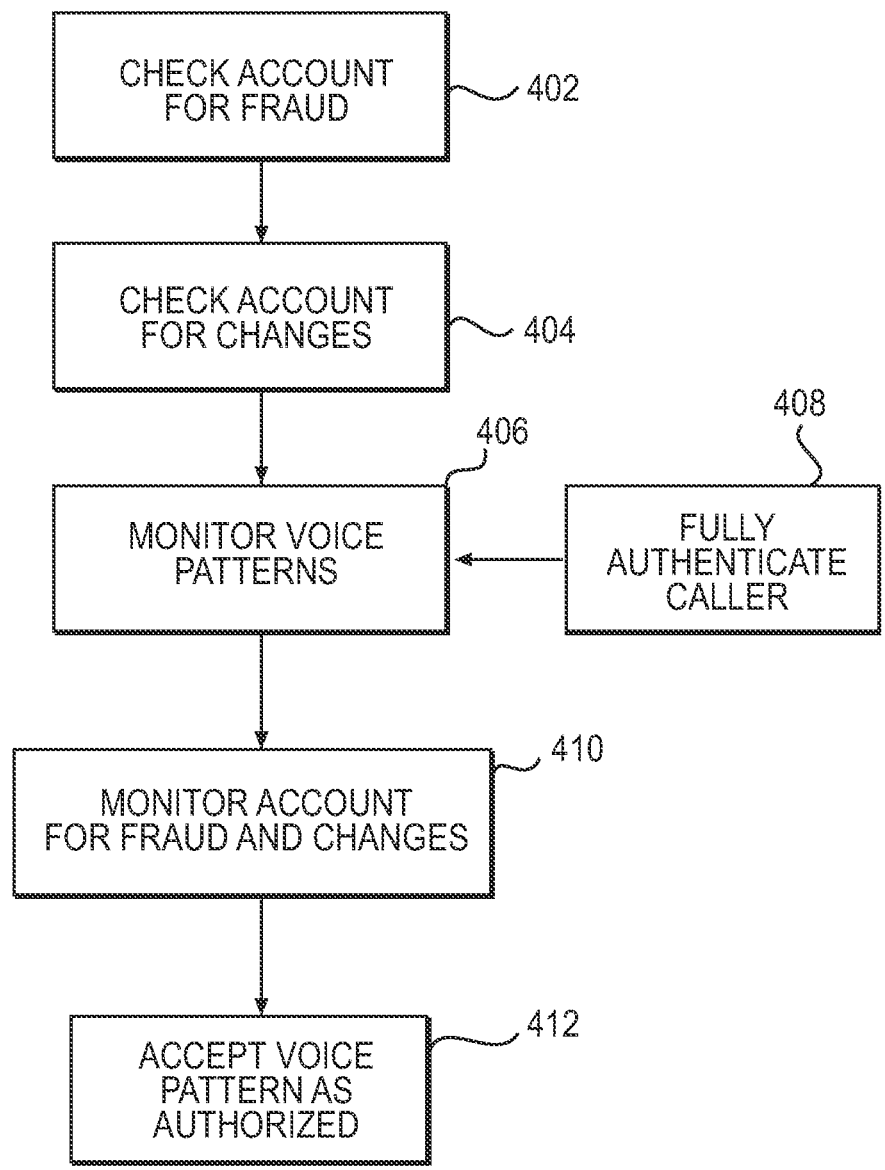
FIG. 4 illustrates an exemplary method for evaluating and storing voice prints.

FIG. 4 illustrates an exemplary method 400 for evaluating and storing voice prints. Initializing the process for authenticating a voice print and storing a voice as being associated with an authorized user may occur either passively or actively. With passive evaluation, method 400 may first check whether an account has recently experienced fraud at step 402. If an account has experienced fraud in, for example, the last month, then a voice print may be more likely to be from a fraudulent caller. Accordingly, method 400 may monitor the voice prints for inclusion in fraudulent database 120, 122, and/or 124, suspend recording voice, or continue with recording the voice but require additional samples or time before storing the voice print as one that is authorized.

Similarly, method 400 may check for any recent account changes at step 404. For example, changing the address associated with an account or adding an authorized user recently may indicate a higher likelihood that the call originates from a fraudulent caller. The precautionary steps described with reference to step 402 therefore may be used. Further, if step 402 or step 404 suggests the possibility of fraudulent activity, an agent 124 may fully authenticate a caller before proceeding to monitor voice prints.

At step 408, rather than or in addition to passively evaluating an account, a call agent or the system may fully authenticate a caller through a series of questions before recording voice prints. For example, a caller may be asked a complete list of security questions to ensure that the caller is authorized. The caller may be notified that these questions must be answered to authenticate the caller's voice into the authorized voice database.

At step 406, method 400 may monitor voice prints. This may occur over a single call or multiple calls spaced out in time. A minimum duration or amount of voice prints may, in one exemplary embodiment, be required to ensure that enough data has been stored to accurately match future calls to the stored voice prints. For example, at least twenty, thirty, or forty seconds of voice prints may need to be recorded, over one or more calls. Next, at step 410, method 400 may again monitor the account associated with new voice prints for fraud or changes for a period of time. This period of time allows the voice prints to age before becoming an acceptable form of authentication.

In one exemplary embodiment, new voice prints may be provisionally stored in pending database 310 of FIG. 3 for a period of time before the voice prints can be used for authentication. Examples of time periods sufficient to confirm a lack of fraudulent activity include one or two months. Alternatively, or in addition, a predetermined number of transactions must occur after initially storing voice prints to ensure an absence of fraud. Unauthorized callers may call in and seek to establish their voice as an authenticated voice, and typically would proceed with trying to complete a fraudulent transaction soon after establishing voice authentication. For example, an unauthorized caller may call to establish voice recognition, and then call back later that day or the next day attempting a balance transfer. If the voice has already been accepted, the balance transfer may be inappropriately allowed, leading to fraud. However, by monitoring the account for fraud and changes at step 410 before accepting voice prints for use in future authentication, increased security can be assured.

If fraud monitoring or significant account changes are not detected at step 410, then the voice print may be accepted as authorized in step 412. The voice prints may therefore transfer from pending database 310 to authorized database 312 (also shown as customer voiceprint database 120 in FIG. 1). If, however, fraud or changes have been detected, the voice prints may be transferred to unauthorized database 314 and/or 326 of FIG. 3 (also shown as fraudster database 120 in FIG. 1). Although not illustrated, method 400 may repeat after step 412 to monitor incoming voice prints for future calls 406 and monitor for fraud and changes at step 410. This will increase the robustness of voice samples, leading to more accurate scores for future calls, and also will account for changes to a user's voice due to aging or other circumstances. Should fraud be detected, the voice samples may be deleted or marked as fraudulent, and a user may be re-enrolled as described with reference to FIG. 4.

Figure 5:
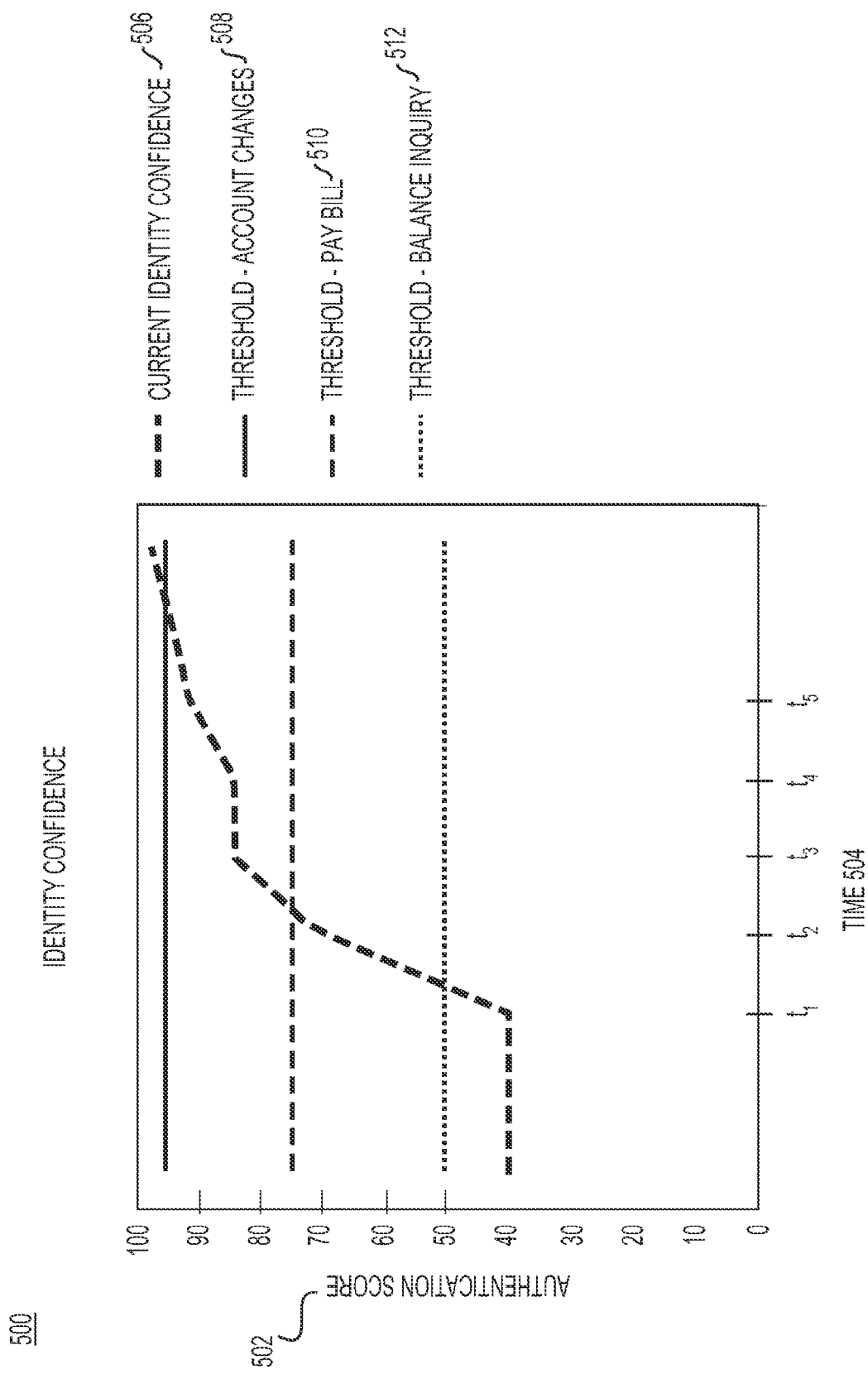
FIG. 5 illustrates an exemplary identification confidence score during a call.

FIG. 5 illustrates a graph showing an identification confidence score 502 increasing over time 504 on a call. Different levels of identification confidence may be required for various transactions. For example, the level to conduct a balance inquiry 512 may be lower than the required authentication to pay a bill 510. Making account changes 508, such as changing an address or requesting another copy of a debit or credit card, may require even higher security. The current identification confidence score 506 may increase throughout a call, with levels varying, for example, as shown at times $t_1$ through $t_5$. At each of the designated times, the system may receive additional information that increases the identification confidence score 502.

For example, at time $t_1$, the caller may have provided basic identifying information using keypad input, and may start talking which will initiate voice recognition. After talking for an amount of time, the current identification score 506 increases above the threshold required to perform a balance inquiry 512. With or without providing additional information, the current identification confidence score 506 may continue to increase at time $t_2$ to pass the threshold required to pay a bill. Then, a caller may provide additional information, such as an account number, or may simply continue talking, which will increase the voice recognition matching, at times $t_3$ through $t_5$ until the caller receives authentication to make account changes 508. In this manner, a caller need not be bothered with providing all of the authenticating information required to make an account change when all a caller wants to do early in a call is conduct a balance inquiry. This saves time for call operators, and the real-time feedback throughout a call increases the likelihood that a caller will be properly authenticated.

Figure 6A:
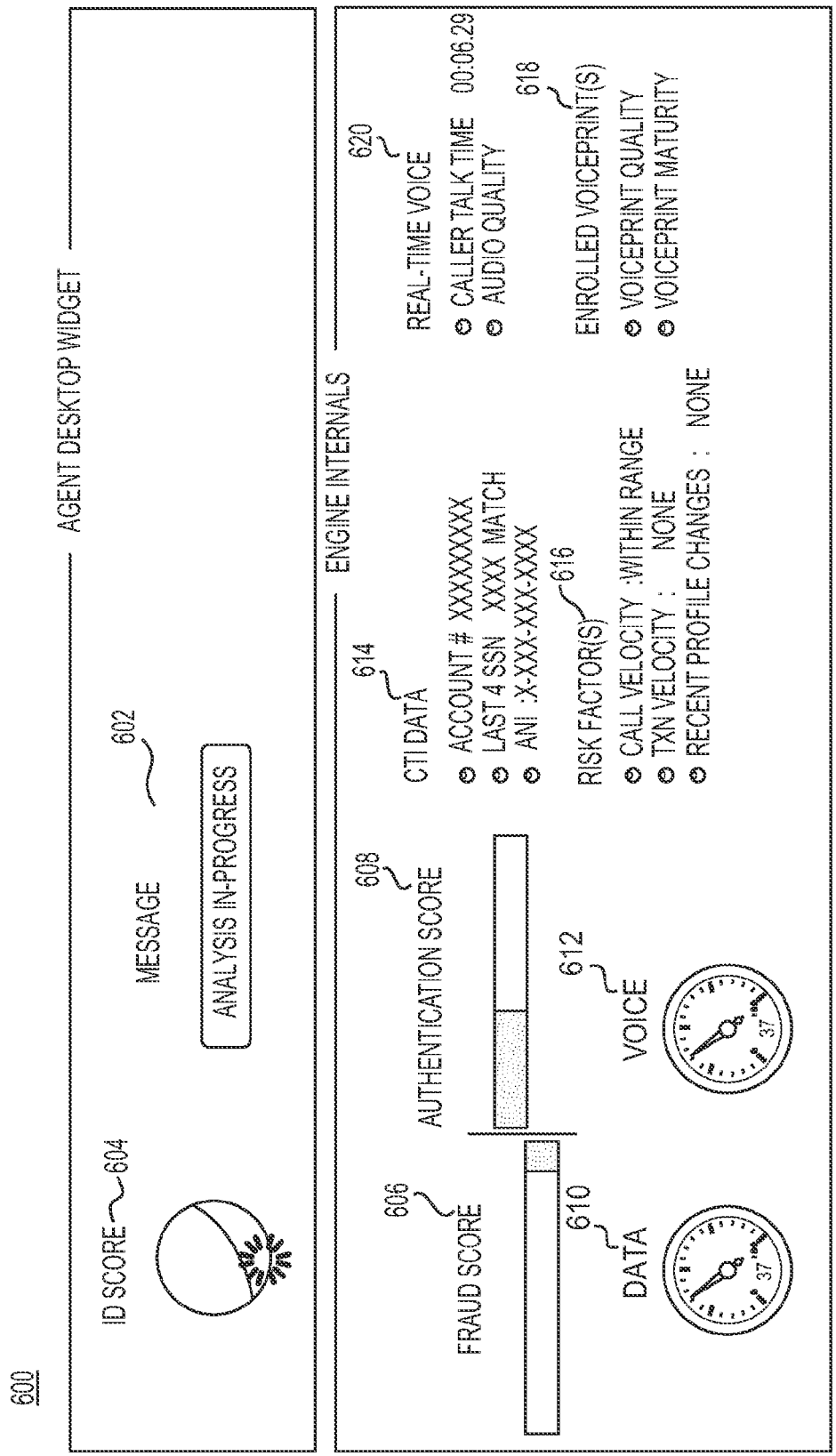
FIGS. 6A-6C illustrate exemplary user interfaces for authenticating a user.
Figure 6B:
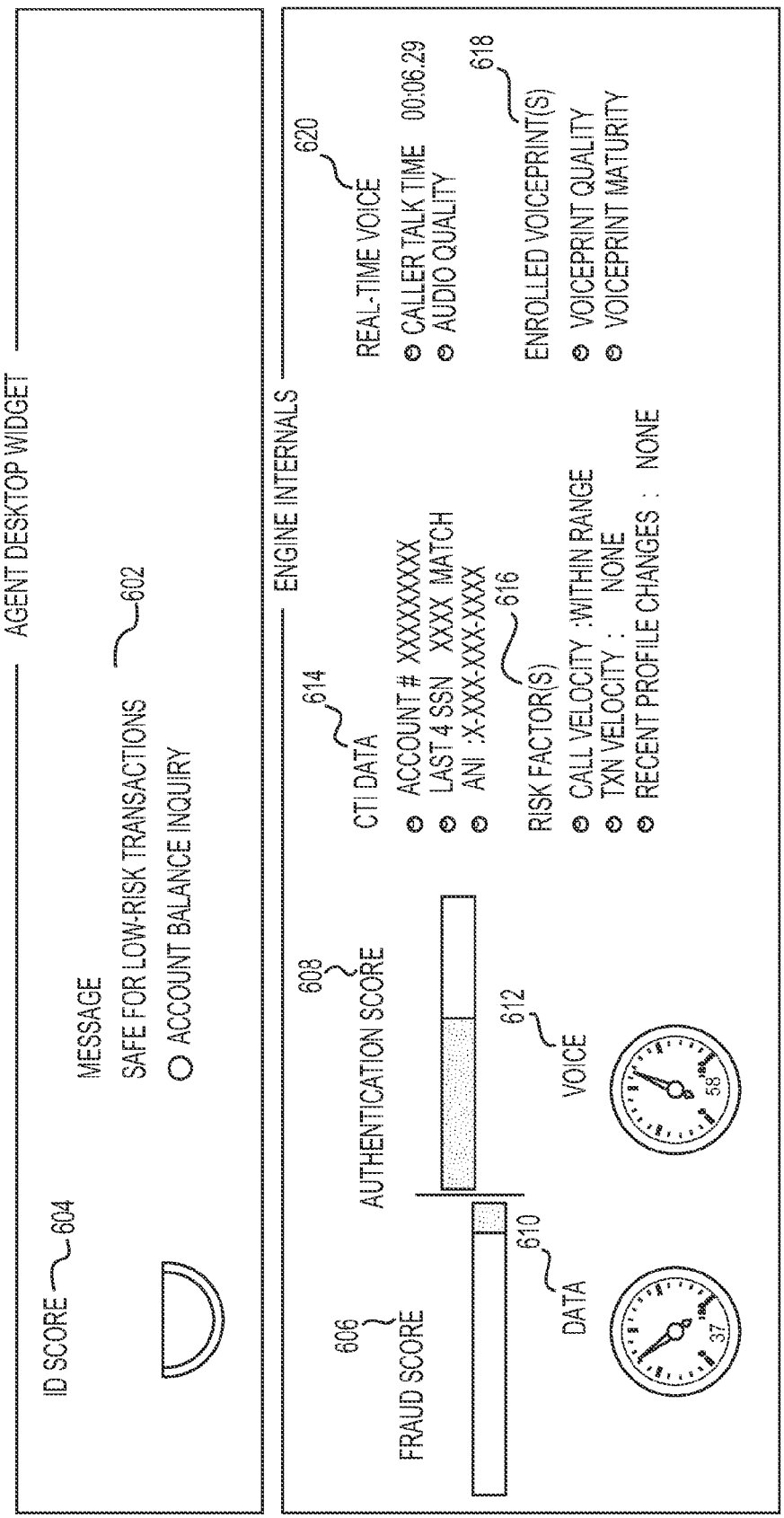
Figure 6C:
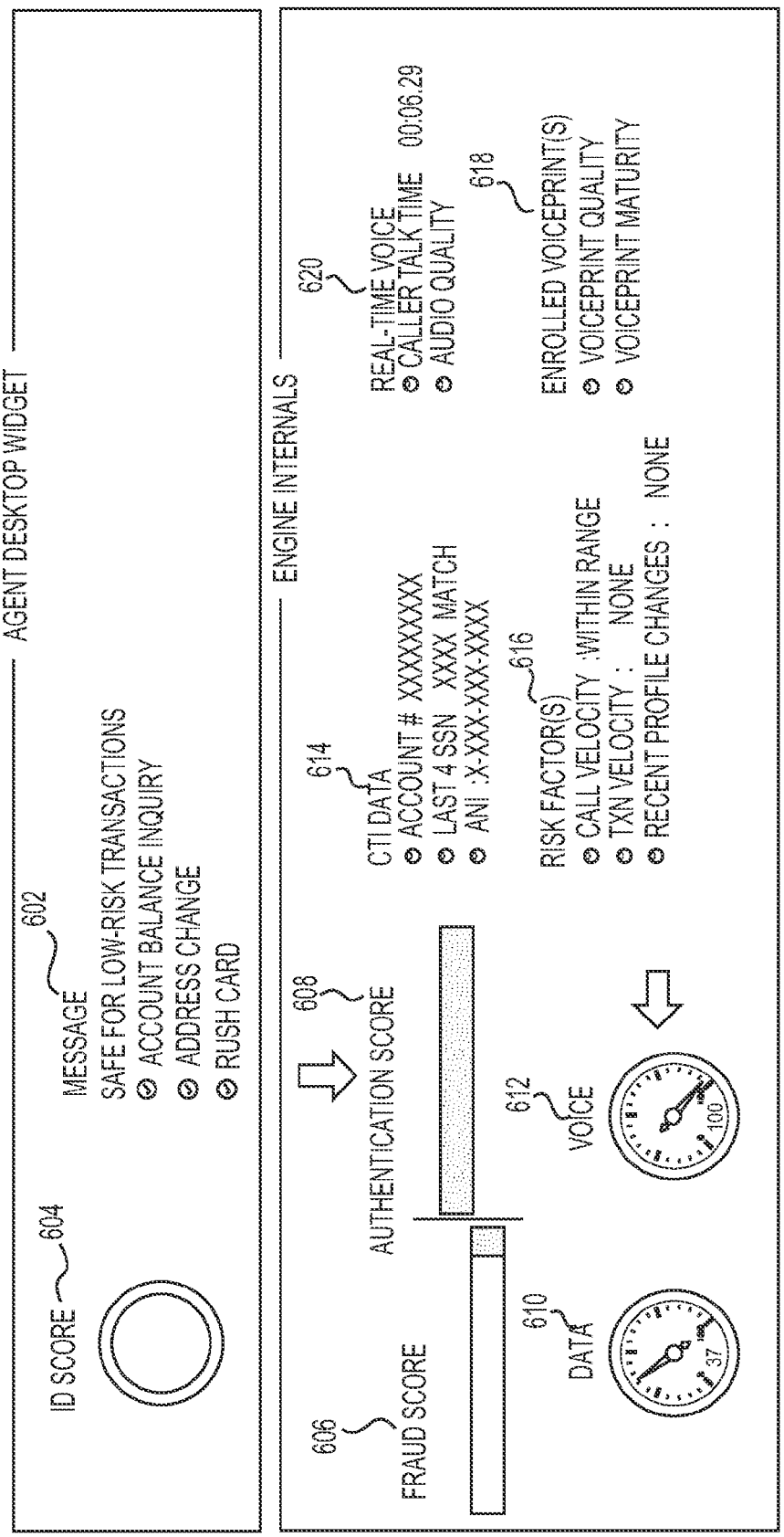

Turning now to FIGS. 6A-6C, exemplary user interfaces 600 for authenticating a user will be described. The user interface may be displayed to a call agent 124 throughout a call. User interface 600 may display a message 602 at the beginning of a call that indicates analysis is in-progress. At this point, the identification confidence score 604, which may be shown in a color-coded fashion, may be, for example, yellow to indicate that analysis is ongoing. Identification confidence score 604 may also be shown as a bar graph, a pie chart that fills up, a percentage, or in a number of other fashions that provide an easy-to-understand indication to a call agent 124 as to whether the user has been authorized for a particular transaction.

Fraud score 606 may indicate a likelihood that the caller is unauthorized, such as when a user incorrectly answers identification questions, calls at an unusual time, calls from an unidentified phone number, or has a voice matching characteristics of unauthorized callers. The presence of fraud may turn the identification confidence score 604 to red and an appropriate message 602 may be displayed. Authorized voice score 608 may also represent the initial score relating to whether a voice print matches authorized voice prints in a different form. In this example, fraud score 606 and authorized voice score 608 are shown as a bar graph that increases or decrease to indicate a likelihood of fraud or authentication. The initial metadata score 610 and authorized voice score 612 (shown in dial fashion) may be displayed, which may increase throughout a call as more data and voice samples are obtained.

User interface 600 may also display CTI data 614, which may include, for example, an account number, the last four digits of a caller's indicated social security number, and the ANI or caller ID number from which the call was placed. This information may be collected automatically through voice prompt, and then transferred by CTI 112 to user interface 600 for agent 124. Risk factors 616 may indicate the call velocity, which indicates whether the call volume for this particular user is within a historical range. For example, a high call volume within a short period, such as within a single day or week, may indicate repeated unauthorized attempts to gain access to an account, or simply that a user may be upset. Transaction velocity likewise may indicate that an unusually high number of transactions, such as balance transfers and address changes, have occurred recently which may suggest fraudulent activity. The call velocity, transaction velocity, and presence or absence of recent profile changes may also be used in calculating the scores previously described.

Enrolled voiceprints 618 may indicate to an agent 124 the quality of a voiceprint and how long a voiceprint has been stored by the system using voiceprint maturity. This information may be displayed in a variety of manners, such as using color-coding, a date range, a percentage, or any other fashion that will indicate to the agent 124 the quality and maturity of voiceprints. Voiceprint quality may increase when a user's account has multiple stored copies of voiceprints as opposed to just one. Voiceprint maturity may indicate the amount of time the voiceprint has been stored by the system. Real-time voice 620 may indicate the caller talk time and audio quality, both additional factors that can be used when computing the initial scores, confidence interval score, and overall identification confidence score.

With reference to FIG. 6B, user interface 600 now indicates a longer call time and correspondingly higher authorized voice score 608, 612. In this example, the user has not provided any additional metadata, so the data score 610 has not increased, but the longer talk time has increased the authorized voice score 608 such that user interface 600 displays a message 602 indicating that the caller has been authorized for low-risk transactions. Message 602 may also provide guidance to the agent 124, such as indicating what types of transactions qualify as low-risk transactions. In this example, an account balance inquiry may be permitted.

With the passage of additional time, FIG. 6C illustrates an even higher authorized voice score 608, 612. The data score 610, however, remains at thirty-seven as illustrated, but having complete voice recognition will result in a message 602 indicating the caller has been authorized for all transactions. Again, these transactions may be listed for an agent 124, including an account balance inquiry, address change, and rush mailing a replacement debit or credit card. Although not illustrated, message 602 in combination with identification confidence score 604 may also alert an agent 124 of the possibility of fraud. Identification confidence score 604 may turn red, and message 602 may indicate the caller should not be allowed to conduct any transactions. Further, the agent 124 may be instructed to keep talking with the caller to build the voice prints for storage in the fraudulent database. The agent 124 may ask for verifying metadata, reverting back to asking questions such as address, mother's maiden name, and others, in an effort to determine whether the caller is actually fraudulent. Additional guidance may also be provided to an agent, such as transferring the call to a supervisor or a company's fraud department.

When the logical operations described herein are implemented in software, the process may execute on any type of computing architecture or platform. For example, referring to FIG. 7, an example computing device upon which embodiments of the invention may be implemented is illustrated. In particular, voice-over IP switch 106, Ethernet switch 108, on-premise appliance 110, CTI 112, biometric analysis cloud 116, databases 118, 120, and 122, as well as the modules described in FIG. 3, may be one or more computing devices, such as computing device 700 shown in FIG. 7.

Figure 7:
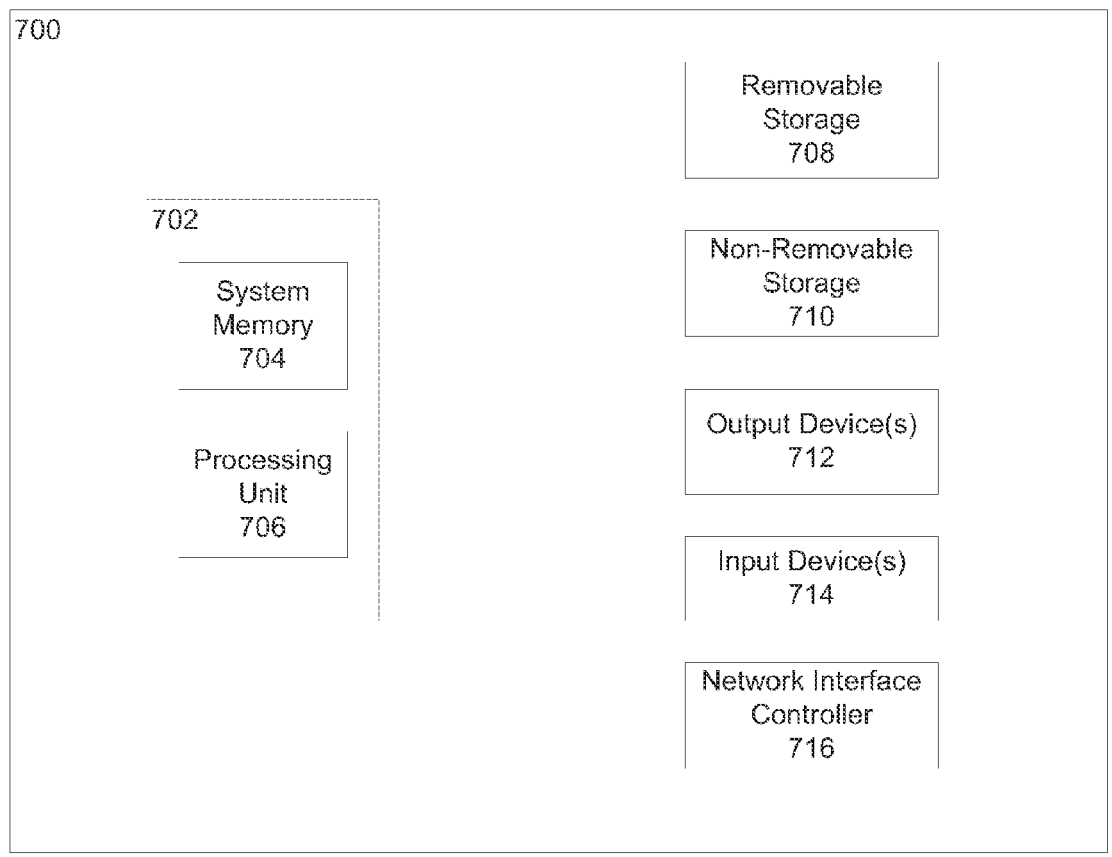
FIG. 7 illustrates an exemplary computer consistent with various embodiments.

The computing device 700 may include a bus or other communication mechanism for communicating information among various components of the computing device 700. In its most basic configuration, computing device 700 typically includes at least one processing unit 706 and system memory 704. Depending on the exact configuration and type of computing device, system memory 704 may be volatile (such as random access memory (RAM)), non-volatile (such as read-only memory (ROM), flash memory, etc.), or some combination of the two. This most basic configuration is illustrated in FIG. 7 by dashed line 702. The processing unit 706 can optionally be a standard programmable processor that performs arithmetic and logic operations necessary for operation of the computing device 700. Alternatively, the processing unit 706 can optionally be an application specific integrated circuit ("ASIC") that performs arithmetic and logic operations necessary for operation of the computing device 700.

Computing device 700 may have additional features/functionality. For example, computing device 400 may include additional storage such as removable storage 708 and non-removable storage 710 including, but not limited to, magnetic or optical disks or tapes. Computing device 700 may also contain network connection(s) 716 that allow the device to communicate with other devices. Computing device 700 may also have input device(s) 714 such as a keyboard, mouse, touch screen, etc. Output device(s) 712 such as a display, speakers, printer, etc. may also be included. The additional devices may be connected to the bus in order to facilitate communication of data among the components of the computing device 700. All these devices are well known in the art and need not be discussed at length here.

The processing unit 706 may be configured to execute program code encoded in tangible, computer-readable media. Computer-readable media refers to any media that provides data that causes the computing device 700 (i.e., a machine) to operate in a particular fashion. Various computer-readable media may be utilized to provide instructions to the processing unit 706 for execution. Common forms of computer-readable media include, for example, magnetic media, optical media, physical media, memory chips or cartridges, or any other tangible medium from which a computer can read. Example computer-readable media may include, but is not limited to, volatile media, non-volatile media and transmission media. Volatile and non-volatile media may be implemented in any method or technology for storage of information such as computer readable instructions, data structures, program modules or other data. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 706 may execute program code stored in the system memory 704. For example, the bus may carry data to the system memory 704, from which the processing unit 706 receives and executes instructions. The data received by the system memory 704 may optionally be stored on the removable storage 708 or the non-removable storage 710 before or after execution by the processing unit 706.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as CD-ROMs, flash drives, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

While this specification contains many specific implementation details, these should not be construed as limitations on the claims. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

It should be appreciated that the logical operations described herein with respect to the various figures may be implemented (1) as a sequence of computer implemented acts or program modules (i.e., software) running on a computing device, (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

What is claimed is:

1. A method for authentication, comprising:
    obtaining identifying data and a voice print from a caller;
    obtaining account behavior information pertaining to a financial account, wherein the account behavior information uniquely identifies historic financial transaction patterns for a previously authenticated user associated with the account;
    comparing the voice print to one or more stored voice prints;
    calculating four or more initial scores that each indicate a likelihood that the caller is the previously authenticated user, wherein the four or more initial scores comprise:
        (a) an initial metadata score calculated based on the account behavior information and the identifying data;
        (b) an initial device score calculated based on device fingerprinting and monitoring signal variances;
        (c) an initial fraud voice score calculated based on the comparison of the voice print to the one or more stored voice prints, wherein the one or more stored voiceprints comprise one or more fraudulent voice prints; and
        (d) an initial authorized voice score calculated based on the comparison of the voice prints to the one or more stored voiceprints, wherein the one or more stored voiceprints further comprise one or more authorized voiceprints for that account;
    calculating a confidence interval score that accounts for any change in confidence that the four or more initial scores are correct;
    determining whether to authenticate based on differences between the four or more initial scores and the confidence interval score.

2. The method of claim 1, further including generating an identification confidence score by combining the confidence interval score and the four or more initial scores.

3. The method of claim 2, further including updating at least one of the confidence interval score, the four or more initial scores, or the identification confidence score in real-time during a call.

4. The method of claim 1, further including authorizing the voice prints by:
    monitoring an account associated with the obtained voice print for fraud; and
    authorizing the obtained voice print after the monitoring indicates an absence of fraud.

5. The method of claim 4, further including monitoring the account for at least one of predetermined amount of time or a predetermined number of transactions.

6. The method of claim 1, further including:
    classifying the stored voice prints as authorized voice prints or unauthorized voice prints; and
    sharing the unauthorized voice prints in a global database.

7. A non-transitory computer-readable medium comprising instructions which, when executed by a processor, perform a method for authentication, comprising:
    obtaining identifying data and a voice print from a caller;
    obtaining account behavior information pertaining to a financial account, wherein the account behavior information uniquely identifies historic financial transaction patterns for a previously authenticated user associated with the account;
    comparing the voice print to one or more stored voice prints;
    calculating four or more initial scores that each indicate a likelihood that the caller is the previously authenticated user, wherein the four or more initial scores comprise:
        (a) an initial metadata score calculated based on the account behavior information and the identifying data;
        (b) an initial device score calculated based on device fingerprinting and monitoring signal variances;
        (c) an initial fraud voice score calculated based on the comparison of the voice print to the one or more stored voice prints, wherein the one or more stored voiceprints comprise one or more fraudulent voice prints; and
        (d) an initial authorized voice score calculated based on the comparison of the voiceprints to the one or more stored voiceprints, wherein the one or more stored voiceprints further comprise one or more authorized voiceprints for that account;

calculating a confidence interval score that accounts for any change in confidence that the four or more initial scores are correct;

determining whether to authenticate based on differences between the four or more initial scores and the confidence interval score.

8. The computer-readable medium of claim 7, further including instructions which, when executed by the processor, generate an identification confidence score by combining the confidence interval score and the four or more initial scores.

9. The computer-readable medium of claim 8, further including instructions which, when executed by the processor, update at least one of the confidence interval score, the four or more initial scores, or the identification confidence score in real-time during a call.

10. The computer-readable medium of claim 7, further including instruction which, when executed by the processor, authorize the voice prints by:

monitoring an account associated with the obtained voice print for fraud; and authorizing the obtained voice print after the monitoring indicates an absence of fraud.

11. The computer-readable medium of claim 10, further including instructions which, when executed by the processor, monitor the account for at least one of predetermined amount of time or a predetermined number of transactions.

12. The computer-readable medium of claim 7, further including instructions which, when executed by the processor:

classify the stored voice prints as authorized voice prints or unauthorized voice prints; and share the unauthorized voice prints in a global database.

13. A system for authentication, comprising:

a database configured to store one or more voice prints;

a processor configured to:

obtain identifying data and a voice print from a caller;

obtain account behavior information pertaining to a financial account, wherein the account behavior information uniquely identifies historic financial transaction patterns for a previously authenticated user associated with the account;

compare the obtained voice print to the stored voice prints;

calculate four or more initial scores that each indicate a likelihood that the caller is the previously authenticated user, wherein the four or more initial scores comprise:

(a) an initial metadata score calculated based on the account behavior information and the identifying data;

(b) an initial device score calculated based on device fingerprinting and monitoring signal variances;

(c) an initial fraud voice score calculated based on the comparison of the voice print to the one or more stored voice prints, wherein the one or more stored voiceprints comprise one or more fraudulent voice prints; and (d) an initial authorized voice score calculated based on the comparison of the voice prints to the one or more stored voiceprints, wherein the one or more stored voiceprints further comprise one or more authorized voiceprints for that account;

calculate a confidence interval score that accounts for any change in confidence that that four or more initial scores are correct; and determine whether to authenticate based on differences between the four or more initial scores and the confidence interval score.

14. The system of claim 13, wherein the processor further generates an identification confidence score by combining the confidence interval score and the four or more initial scores.

15. The system of claim 14, wherein the processor further updates at least one of the confidence interval score, the four or more initial scores, or the identification confidence score in real-time during a call.

16. The system of claim 13, wherein the processor further authorizes the voice prints by:

monitoring an account associated with the obtained voice print for fraud; and authorizing the obtained voice print after the monitoring indicates an absence of fraud.

17. The system of claim 16, wherein the processor further monitors the account for at least one of predetermined amount of time or a predetermined number of transactions.

18. The system of claim 13, wherein the processor further:

classifies the stored voice prints as authorized voice prints or unauthorized voice prints; and stores the unauthorized voice prints in a global database.

* * * * *